United States Patent

Nishimoto et al.

[11] Patent Number: 5,881,836
[45] Date of Patent: Mar. 16, 1999

[54] ELECTRIC POWER STEERING APPARATUS

[75] Inventors: Mitsuhiko Nishimoto, Kashihara; Kazuyuki Yoshida, Sakurai; Takahiro Aoki, Wako; Masataka Izawa, Wako; Mitsunori Kawashima, Wako, all of Japan

[73] Assignees: Koyo Seiko Co., Ltd., Osaka; Honda Giken Kogyo Kabushiki Kaisha, Tokyo, both of Japan

[21] Appl. No.: 832,949

[22] Filed: Apr. 4, 1997

[30] Foreign Application Priority Data

Apr. 12, 1996 [JP] Japan .................................. 8-091341

[51] Int. Cl.⁶ ..................................................... B62D 5/04
[52] U.S. Cl. ............................................................. 180/446
[58] Field of Search ..................................... 180/443, 446, 180/408, 410; 74/388 PS; 364/424.051, 424.01; 318/696, 721, 434

[56] References Cited

U.S. PATENT DOCUMENTS

| | | |
|---|---|---|
| 4,735,271 | 4/1988 | Shimizu . |
| 4,754,829 | 7/1988 | Shimizu . |
| 4,802,544 | 2/1989 | Maeda . |
| 5,623,409 | 4/1997 | Miller ...................................... 180/446 |
| 5,729,107 | 3/1998 | Shimizu .................................. 180/446 |

*Primary Examiner*—Robert J. Oberleitner
*Assistant Examiner*—C. T. Bartz
*Attorney, Agent, or Firm*—Darby & Darby

[57] ABSTRACT

An electric power steering apparatus which quickly returns the steering wheel to the neutral position with a satisfactory steering feeling by switching a steering wheel return control for assisting the steering wheel return and a steering wheel convergence control for converging the steering wheel to the neutral position by braking a motor, according to the steering condition such as the rotational speed of the steering wheel is fast or slow when returning the steering wheel to the neutral position even when the vehicle speed is equal.

10 Claims, 12 Drawing Sheets

ELECTRIC POWER STEERING APPARATUS

BACKGROUND OF THE INVENTION

The present invention relates to improvement of an electric power steering apparatus for assisting steering force by rotationally driving a motor for assisting steering force under PWM control with a target value of the motor current for the motor determined on the basis of the detected amount of the steering torque used as a target amount for automatic control.

In an electric power steering apparatus for rotationally driving a motor for assisting steering force under PWM control based on the current target value of the motor determined on the basis of the detected amount of steering torque and the detected amount of the driving current for the motor, in case of turning back a steering wheel, steering wheel return current is led to the motor to carry out the steering wheel return control. And, when the steering wheel returns to the position near the neutral position of the steering wheel (steering angle middle point) by which the vehicle is advanced straight, the steering wheel return current is set to zero.

However, even when the steering wheel returns to its neutral position, due to the inertia force of the motor, the steering wheel does not instantly stop rotating in the position but repeats going beyond the neutral position (0°) and then turning back like a pendulum until it converges on the neutral position. Because of this, it takes time before the steering wheel comes to be converged at the neutral position and stops, during which the vehicle running condition is not stabilized. The effect of this phenomenon is especially large in case of a high speed running.

In order to solve such problem, various proposals have been made such as one described in U.S. Pat. No. 4,754,829 which is designed to effect braking the motor for the steering assistance when the conditions of steering torque and steering rotation speed are satisfied either one or both of which are changed by the vehicle speed, one described in U.S. Pat. No. 4,802,544 which is designed to effect braking by short-circuiting between the two terminals of the motor for assisting steering force when the vehicle speed exceeds a predetermined value and the steering is stopped, and one described in U.S. Pat. No. 4,735,271 which is designed to brake the motor for assisting steering force when the steering torque is no more than a predetermined value, steering rotation speed is more than a predetermined value, and the steering system is at the neutral position.

Also, there has already been proposed one as described in U.S. Pat. No. 4,735,271 which is designed to brake the motor for assisting steering force when the steering torque is no more than a predetermined value and the rotation speed of the motor for assisting steering force is higher than a predetermined value.

However, in those conventional arts, relation between the wheel return control and the wheel convergence control for converging the steering wheel to the neutral position is not considered.

Though the vehicle speed is equal, there are cases, according to the steering conditions, where the wheel return control is necessary and where the wheel convergence control is necessary. The wheel convergence control is necessary, for example, if the wheel rotational speed is high near the neutral position in middle speed running, but the wheel return control is necessary if the wheel rotational speed is low near the neutral position at middle speed running.

BRIEF SUMMARY OF THE INVENTION

The present invention is devised to overcome the aforementioned problems. It is an object of the invention to provide an electric power steering apparatus which performs a suitable control, either the wheel return control or the wheel convergence control, according to the steering condition, even when the vehicle speed is equal, gives satisfactory steering feeling, and is able to quickly return the steering wheel to the neutral position.

An electric power steering apparatus according to the present invention is characterized by comprising means for detecting steering angular velocity, and operation switching means for operating motor braking means when a vehicle speed is higher than a first vehicle speed and the steering angular velocity detected by the steering angular velocity detecting means is higher than a first steering angular velocity, and for enabling wheel return control means to operate when the vehicle speed is lower than the first vehicle speed and when the vehicle speed is between the first vehicle speed and a second vehicle speed which is higher than the first vehicle speed and the steering angular velocity is lower than the first steering angular velocity.

By these means, it is possible to perform a suitable control, either the wheel return control or the wheel convergence control, according to the steering condition, that is the rotational speed of the steering wheel, even when the vehicle speed is equal when the vehicle speed is higher than the first vehicle speed but lower than the second vehicle speed, thereby to give satisfactory steering feeling and to enable the steering wheel to quickly return to the neutral position.

The operation switching means is characterized by maintaining the wheel return controlling means continuously operable under the condition that the vehicle speed is between a first vehicle speed and a second vehicle speed which is higher than the first vehicle speed, when the steering angular velocity reaches between a first steering angular velocity and a second steering angular velocity which is lower than the first steering angular velocity from the condition that the steering angular velocity is lower than the second steering angular velocity and the wheel return control is operable. The operation switching means is characterized by maintaining the wheel return controlling means continuously inoperable under the condition that the vehicle speed is between the first and second vehicle speeds, when the steering angular velocity reaches between the first and second steering angular velocities from the condition that the steering angular velocity is higher than the first steering angular velocity and the wheel return control is inoperable.

By these means, a hysteresis is given to the steering angular velocity when the operation switching means switches the condition where the wheel return control means is operable and the condition where the motor braking means operates, thereby to prevent an occurrence of hunting between the wheel return control and motor braking control, so that the steering feeling becomes satisfactory.

The above and further objects and features of the invention will more fully be apparent from the following detailed description with accompanying drawings.

DETAILED DESCRIPTION OF THE INVENTION

Hereinafter, the present invention is described in detail with reference to the drawings to show the embodiment thereof.

Figure 1:
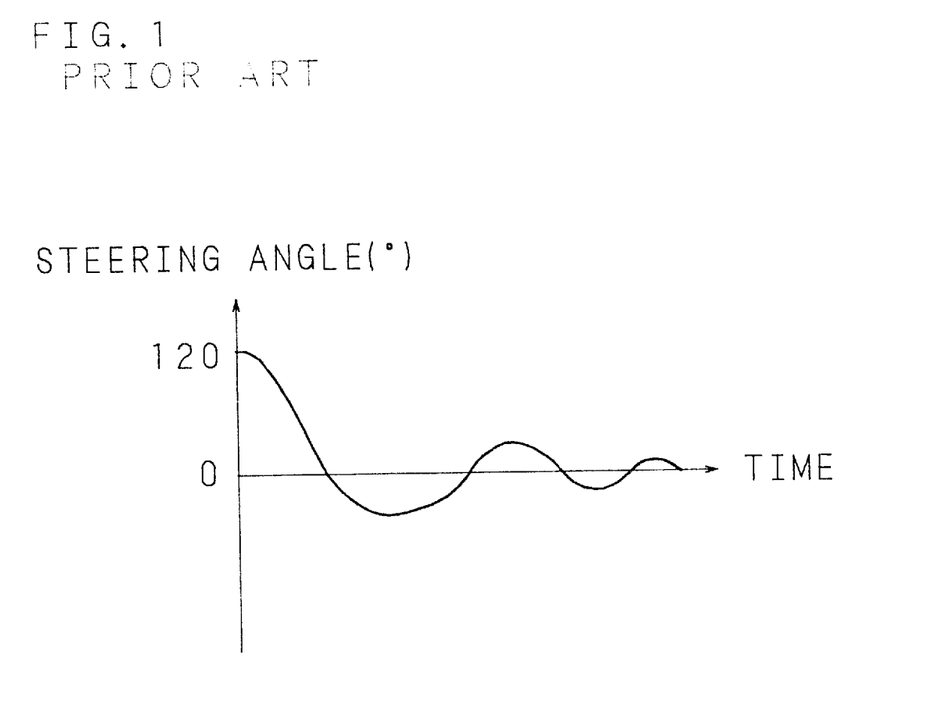
FIG. 1 is a view for illustrating convergence of a steering wheel to a neutral position in a conventional electric power steering apparatus.
Figure 2A:
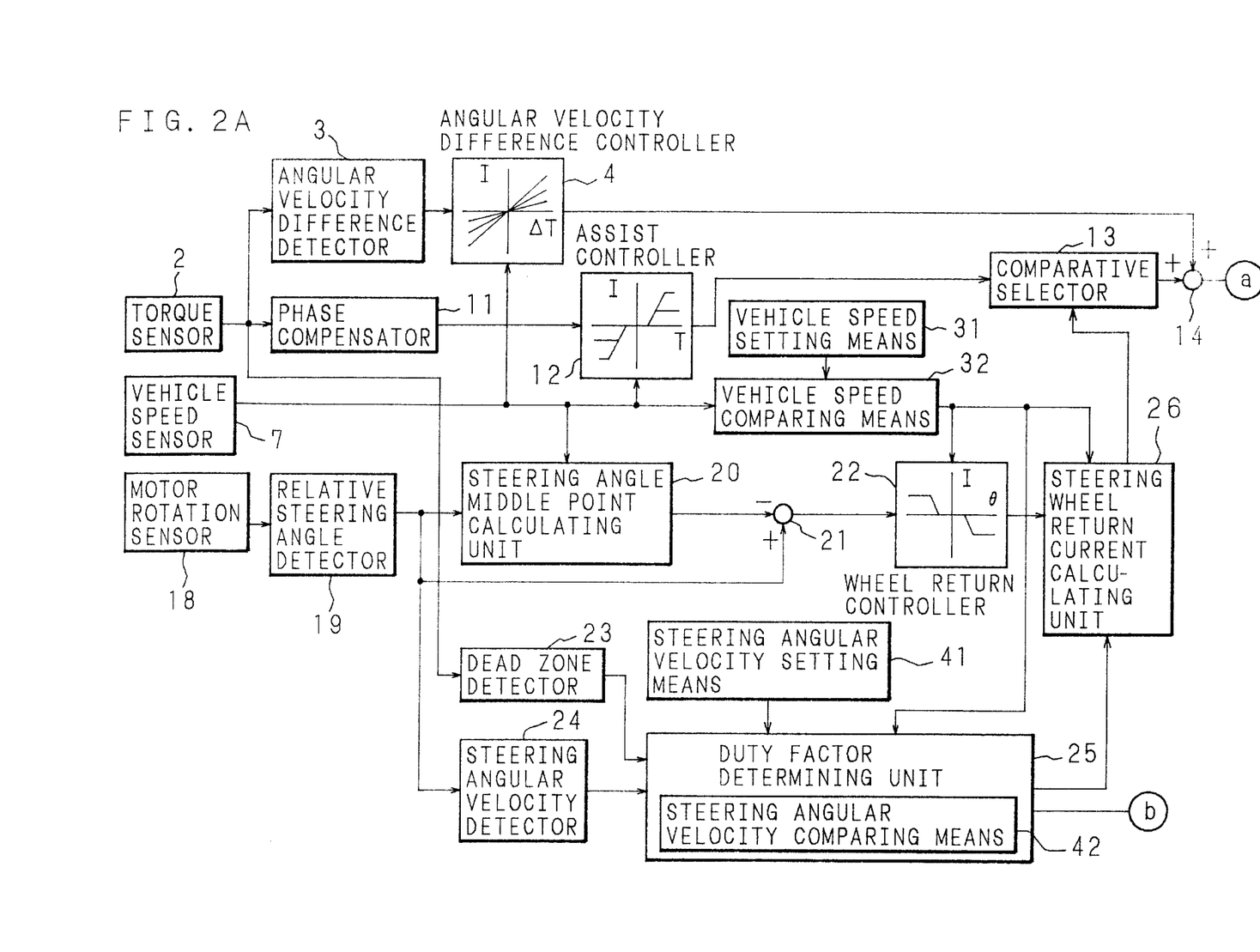
FIGS. 2A and 2B are block diagrams showing a constitution of an essential part of an electric power steering apparatus according to the present invention.
Figure 2B:
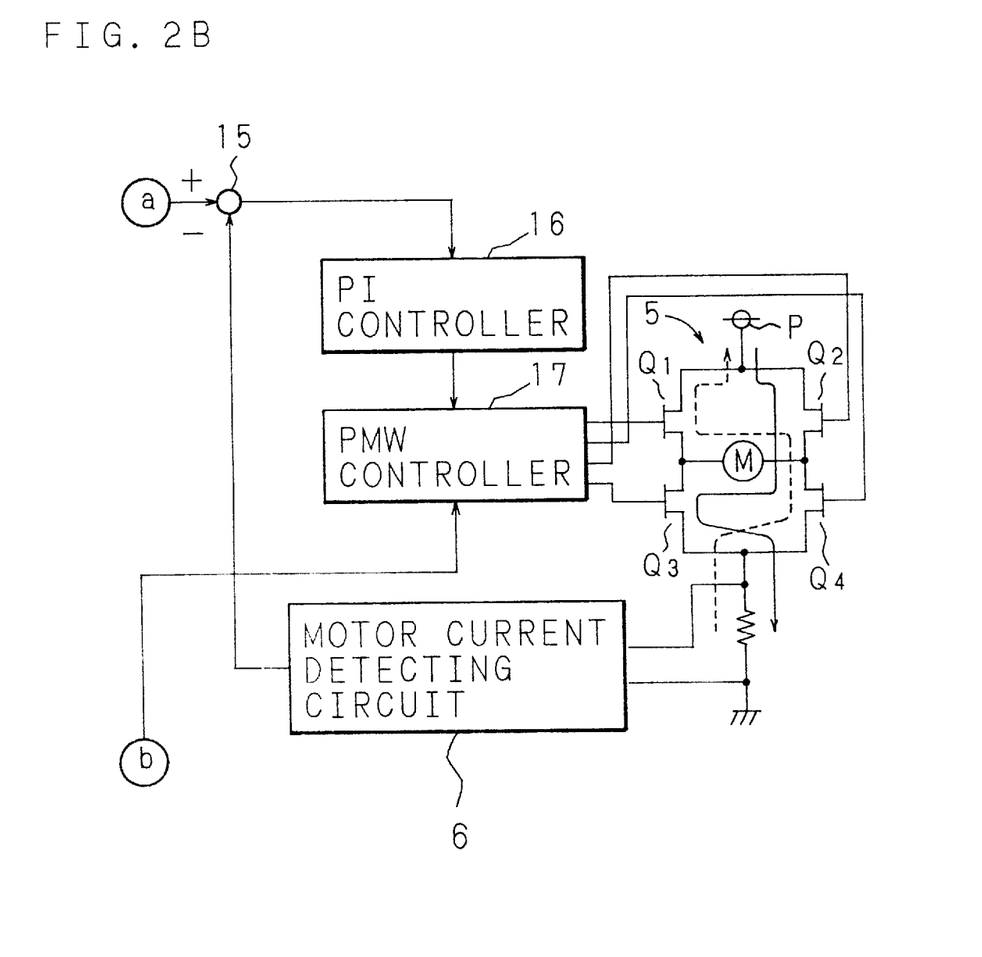

FIGS. 2A and 2B are block diagrams showing a constitution of an essential part of an electric power steering apparatus in an embodiment according to the present invention. In this electric power steering apparatus, a steering torque signal from a torque sensor 2 provided on a steering shaft (not shown) is phase compensated by a phase compensator 11 and then given to an assist controller 12.

A vehicle speed signal from a vehicle speed sensor 7 is given to the assist controller 12, an angular velocity difference controller 4, a steering angle middle point calculating unit 20, and a vehicle speed comparing means 32 for comparing a first vehicle speed set by vehicle speed setting means 31 or a second vehicle speed which is higher than the first vehicle with the vehicle speed from the vehicle speed sensor 7. The vehicle speed signal is supplied to a wheel return controller 22 and a steering wheel return current calculating unit 26, or to a duty factor determining unit 25, according to the comparison result by the vehicle speed comparing means 32. The assist controller 12 outputs a target current value for assist (of steering) control based on the steering torque signal from the phase compensator 11 and the vehicle speed signal from the vehicle speed sensor 7, and gives it to a comparative selector 13. On the other hand, the steering torque signal from the torque sensor 2 is differentiated by an angular velocity difference detector 3 and the differentiated value is given to the angular velocity difference controller 4. The angular velocity difference controller 4 outputs a current value proportionate to the differential value of the given steering torque signal and the vehicle speed signal from the vehicle speed sensor 7 so as to give it to an addition means 14. This current value is used for compensating inertia of a motor M.

A motor revolution number signal from a motor rotation sensor 18 for detecting the number of revolutions of the motor M for assisting steering force is given to a relative steering angle detector 19, and the relative steering angle detector 19 detects the relative steering angle of a steering wheel from the motor revolution number signal and gives the relative angle data to the steering angle middle point calculating unit 20, a subtraction means 21, and a steering angular velocity detector 24.

The steering angle middle point calculating unit 20 calculates the neutral point of the steering angle of the steering wheel by which a vehicle advances straight, and gives the results of the calculation to the subtraction means 21. The subtraction means 21 subtracts the given calculation results from the relative steering angle to obtain the absolute steering angle which is the steering angle from the neutral point of the steering angle, and gives the signal thereof to a wheel return controller 22.

Although, in this embodiment, the relative steering angle is detected on the basis of the revolution number of the motor M coupled to the steering mechanism, the relative steering angle may be detected by detecting, for example, the rotational number of the steering shaft linked to the steering wheel, by making use of a rotary encoder instead of the revolution number of the motor M. Besides, the absolute steering angle may be directly detected instead of detecting the absolute steering angle by making use of the detected value of the relative steering angle.

The wheel return controller 22 outputs the target current value of the motor M for returning the steering wheel, based on the absolute steering angle, and gives it to the steering wheel return current calculating unit 26.

The steering wheel return current calculating unit 26 calculates the target value of the wheel return current by multiplying the target current value given from the steering wheel return controller 22 by a vehicle speed coefficient corresponding to the vehicle speed, and gives it to the comparative selector 13.

The comparative selector 13 compares the respective absolute values of the target current value from the assist controller 12 and the target current value from the steering wheel return current calculating unit 26, then gives the target current value having the larger absolute value to the addition means 14.

The addition means 14 adds the current value given from the angular velocity difference controller 4 to the given target current value, and gives the result of the addition to a subtraction means 15.

The subtraction means 15 obtains the deflection between the addition result from the addition means 14 and the feedback value of the driving current of the motor M detected by a motor current detection circuit 6 and gives the deflection to a PI controller 16. The PI controller 16 adds the deflection (proportional element) and integrated value (integration element) of the deflection to the control amount of the previous case, and gives it to a PWM controller 17 as the current control amount.

The PWM controller 17 converts the control amount to a PWM wave signal and a signal representing the direction of rotation of the motor M and gives the results to a driving circuit 5. The driving circuit 5 has the constitution of the four FETs Q1, Q2, Q3 and Q4 in H-type bridge, with the motor M installed on the bridging part thereof.

The steering angular velocity detector 24 detects from the given relative steering angle a steering angular velocity which is a rotation speed of the steering wheel, and gives it to the duty factor determining unit 25 as a steering angular velocity signal.

The steering torque signal from the above-described torque sensor 2 is also given to a dead zone detector 23. The dead zone detector 23 detects whether the given steering torque signal is in the dead zone of the assist controller 12 or not, and gives the detection signal thereof to the duty factor determining unit 25. The steering torque signal inputted to the dead zone detector 23 is to be the value prior to the practice of the phase compensation. This is because, in the steering torque signal after the phase compensation, a differential element is added and occasions to detect the dead zone decrease.

The duty factor determining unit 25 is provided with a steering angular velocity comparing means for comparing the steering angular velocity detected by the steering angular velocity detector 24 with a first rotational speed of the steering wheel set by the steering angular velocity setting means 41, and with a second rotational speed set by the steering angular velocity setting means 41, which is lower than the first rotational speed. The duty factor determining unit 25 determines a duty factor of PWM control for braking the motor M in accordance with the vehicle speed signal from the vehicle speed sensor 7, the dead zone detection signal from the dead zone detector 23, and the steering angular velocity signal from the steering angular velocity detector 24, and gives the duty factor to the PWM controller 17. Braking of the motor M is effected to converge quickly to the neutral position in returning the steering wheel.

When the control amount given from the PI controller 16 is approximately zero and the duty factor given from the duty factor determining unit 25 is larger than a predetermined amount, the PWM controller 17 makes the two terminals of the motor M in the driving circuit 5 short-circuited under the PWM control based on the duty factor given from the duty factor determining unit 25 to provide a state in which the current flows on the basis of the inverse electromotive force.

Unless lying within the range of the dead zone of the steering angle of the wheel return controller 22 (e.g. −15°~15°), the PWM controller 17 does not carry out PWM control by the duty factor given from the duty factor determining unit 25.

Figure 3:
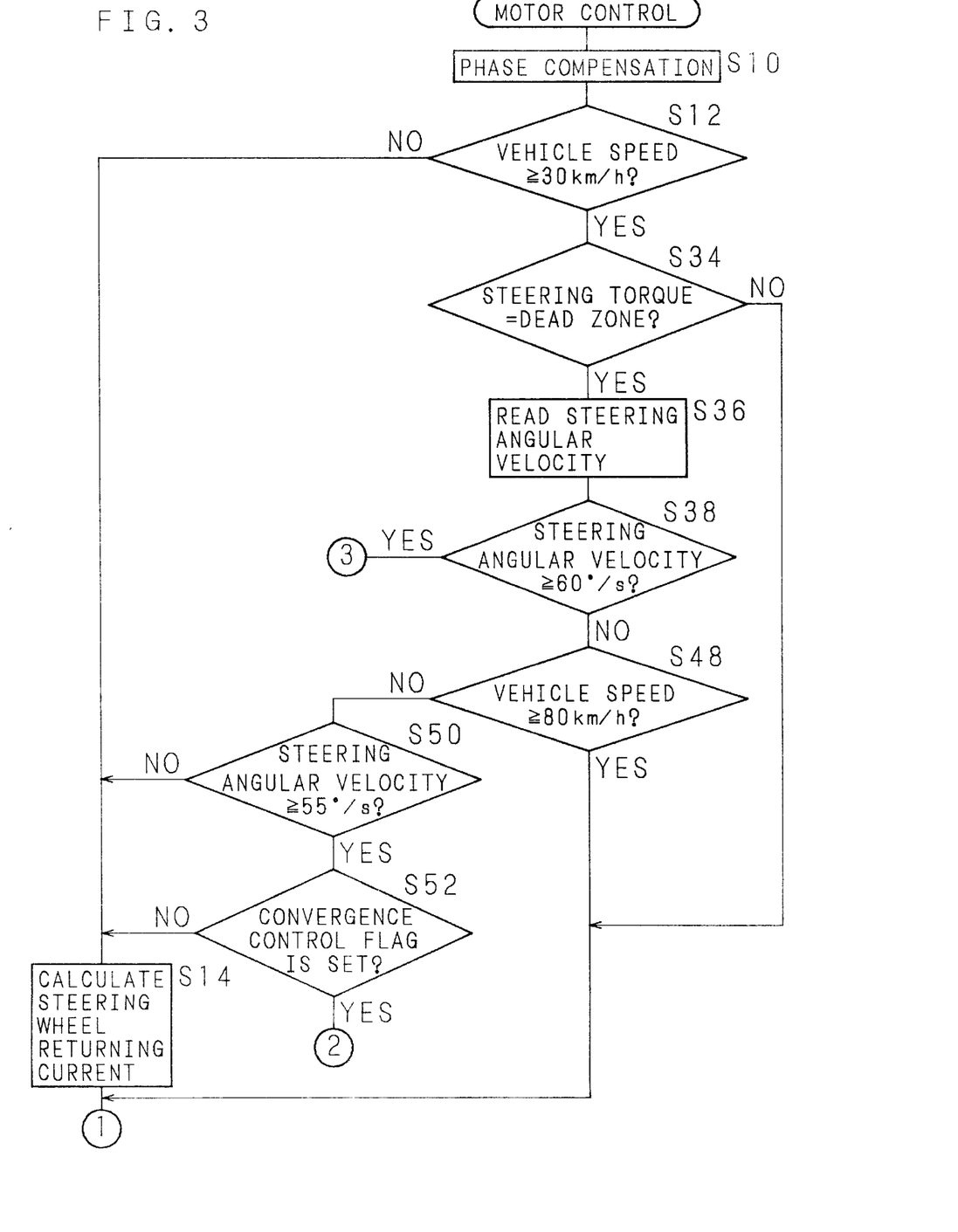
FIG. 3 is a flowchart showing control operation of the power steering apparatus of the invention.
Figure 4:
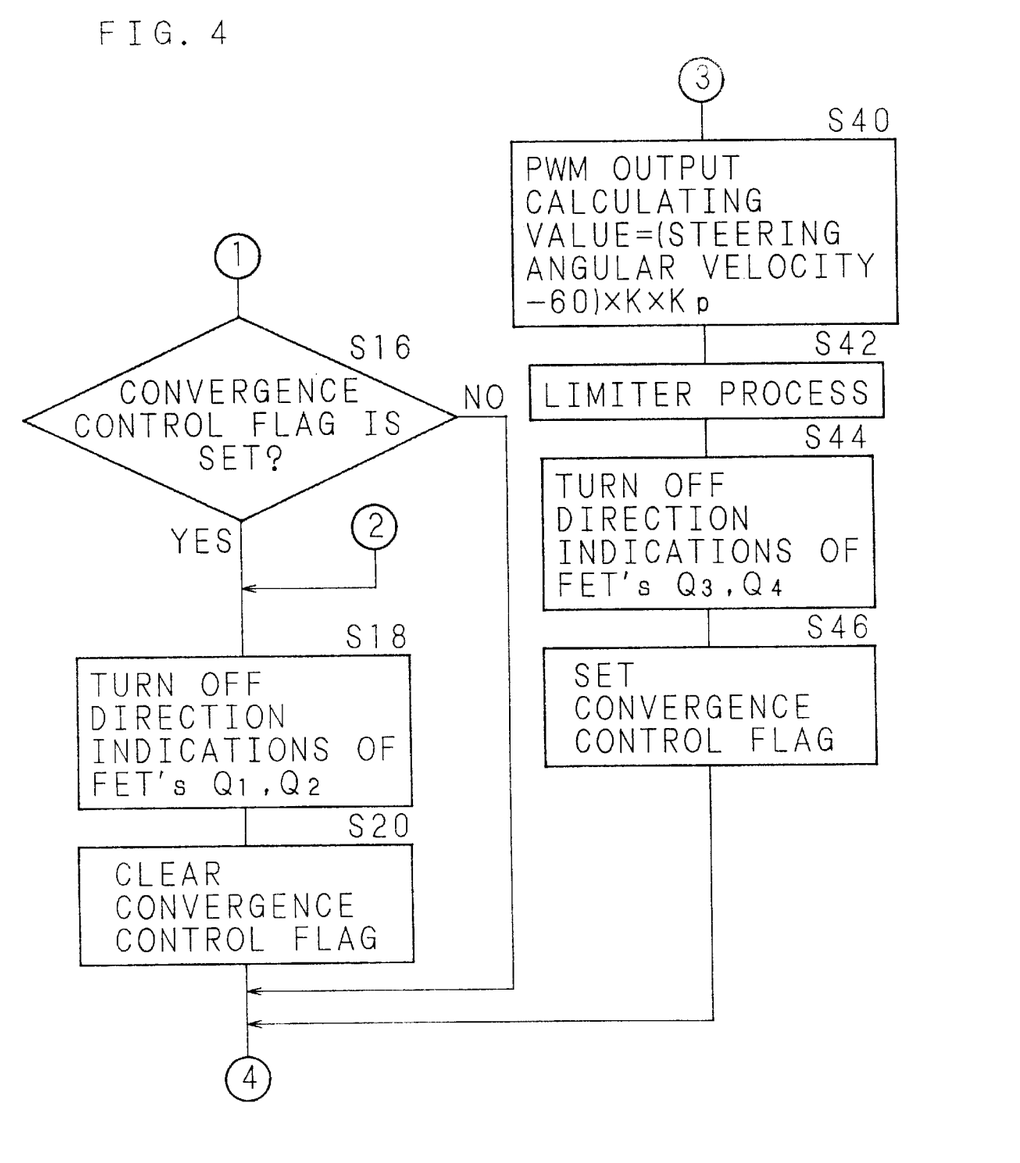
FIG. 4 is a flowchart showing control operation of the power steering apparatus of the invention.
Figure 5:
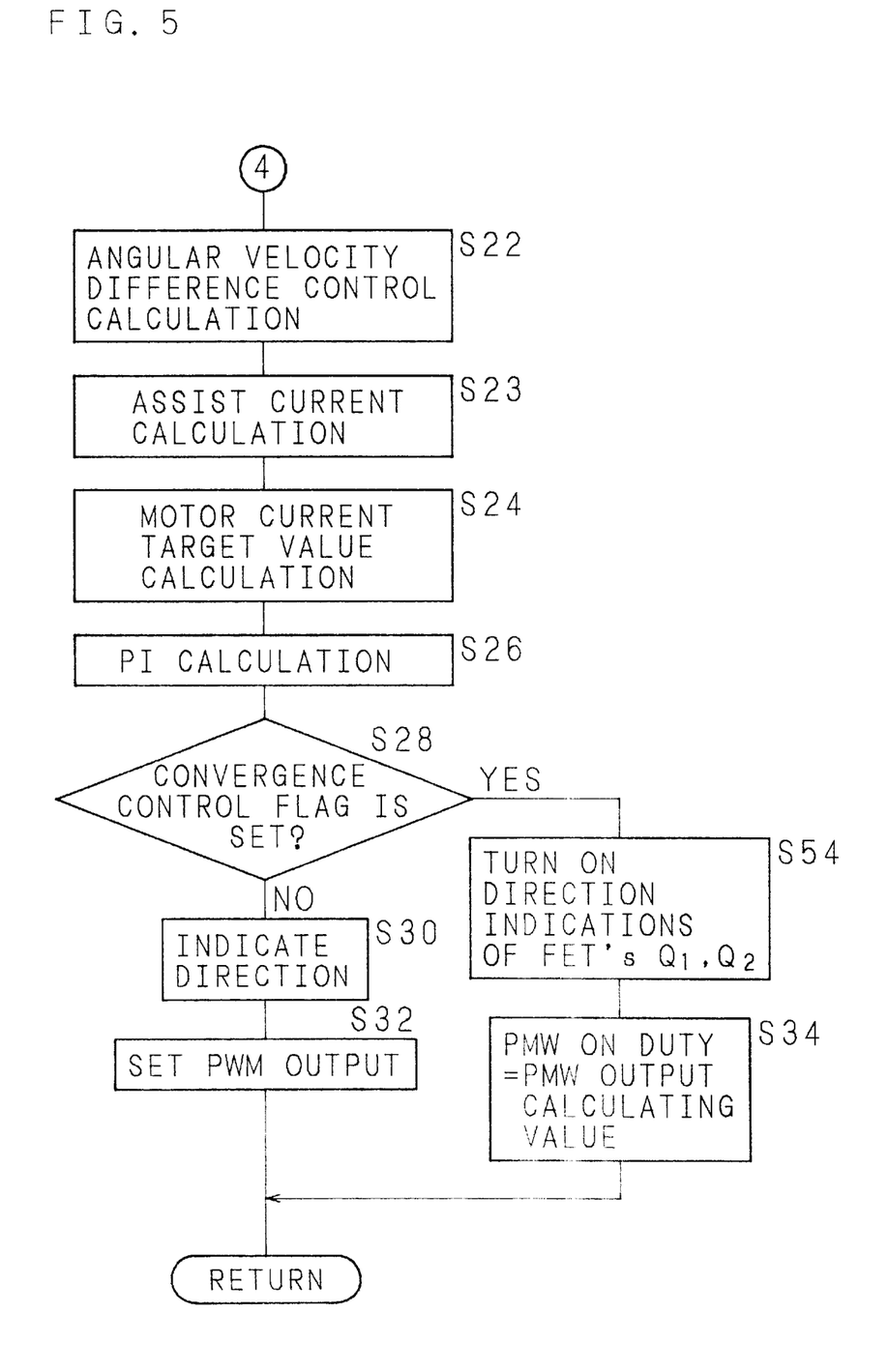
FIG. 5 is a flowchart showing control operation of the power steering apparatus of the invention.

Hereinafter, the control operation of the electric power steering apparatus of the constitution as above will be explained referring to the flowcharts (FIGS. 3, 4, 5).

First, phase compensation of the steering torque signal from the torque sensor 2 is carried out in the phase compensator 11 (S10).

Figure 6:
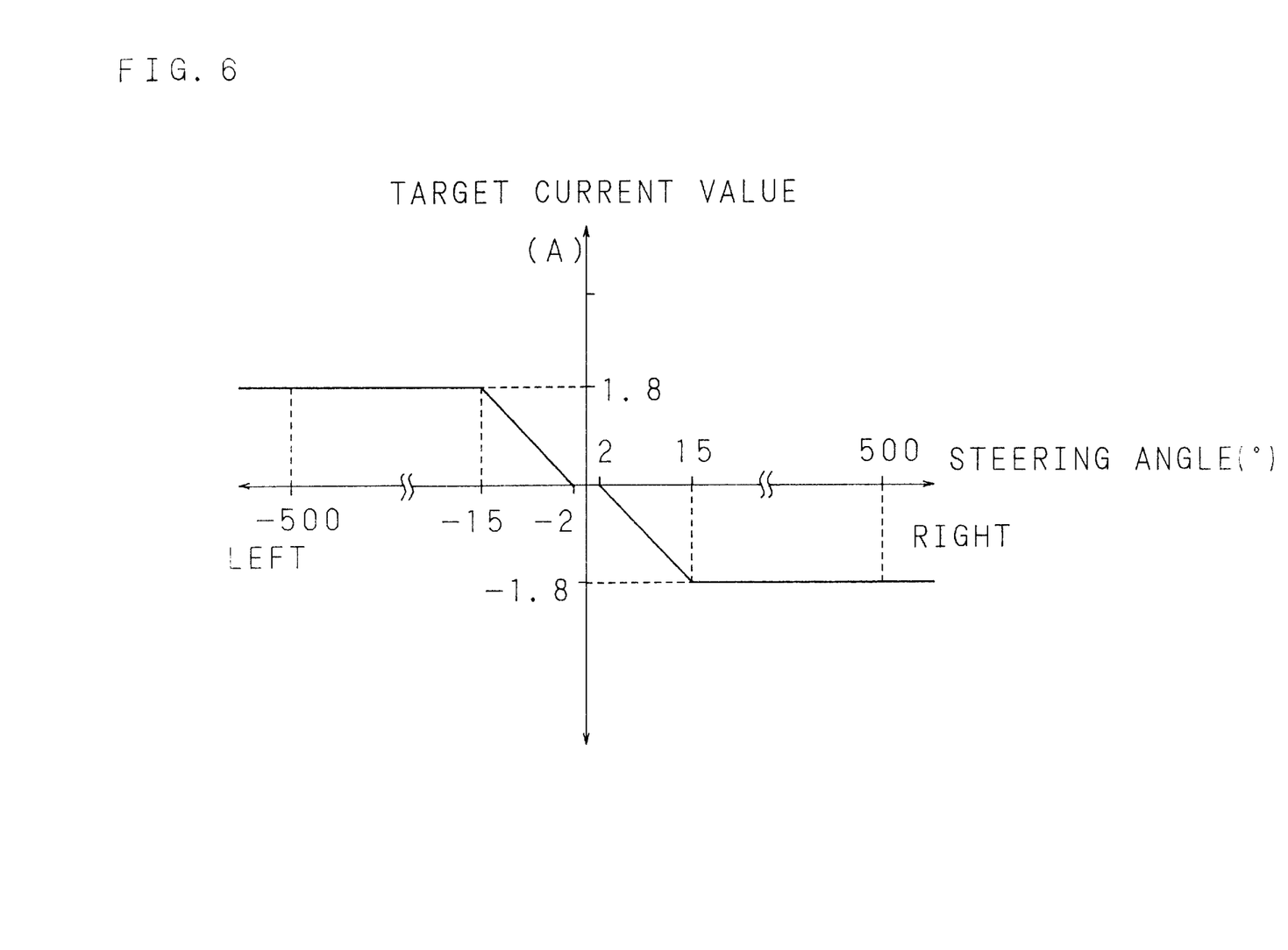
FIG. 6 is a view showing characteristics of an absolute steering angle and a target current for a wheel return.

Next, when the vehicle speed signal from the vehicle speed sensor 7 indicates, for example, less than 30 km/h (S12), in order to make steering wheel returning control for driving the motor M to return the steering wheel to the neutral position, the target current value based on characteristic of the absolute steering angle and the target current for the wheel return is obtained in the wheel return controller 22 and given to the steering wheel return current calculating unit 26. This characteristic is that, as shown in FIG. 6, when the absolute steering angles in the right and left rotation directions are 15° or more, for example, the respective target values for the wheel return become constantly ±1.8A, and when less than 15°, the target current gradually decreases from 1.8A to 0A between −15° and −20° and the absolute value of the target current gradually decreases from −1.8A to 0A between 15° and 20°.

Figure 7:
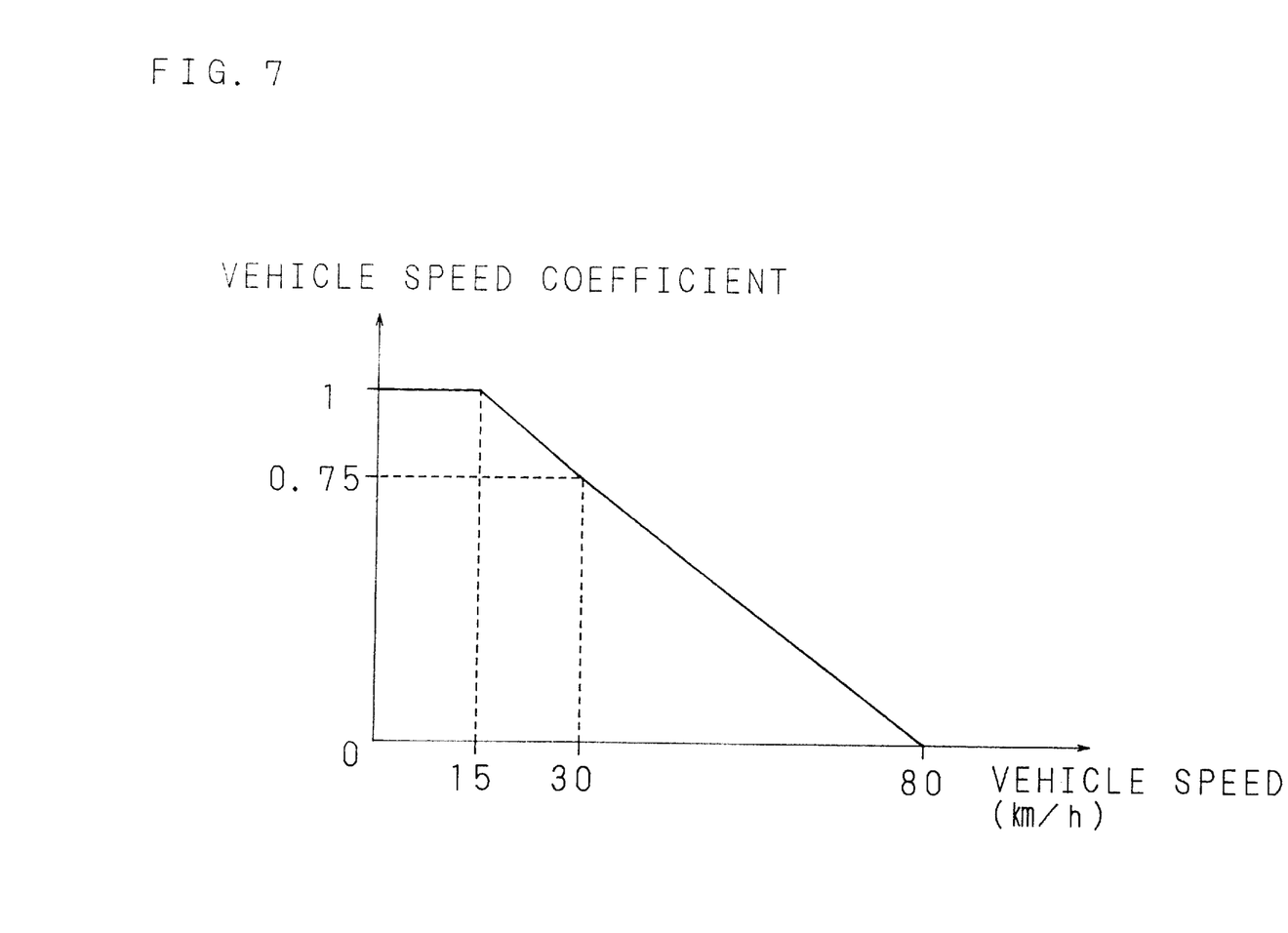
FIG. 7 is a diagram explanatory of a value of a vehicle speed coefficient for calculating the target value of the wheel return current.

The steering wheel return current calculating unit 26 multiplies the given target current value by a vehicle speed coefficient to calculate the target current value for the wheel return (S14). This vehicle speed coefficient, as shown in FIG. 7, is 1.0 when the vehicle speed is within 0 km/h to 15 km/h, gradually decreases from 1.0 to 0 when the vehicle speed is within 15 km/h to 80 km/h, and is 0 when the vehicle speed is higher than 80 km/h.

Next, when a convergence control flag is set and the control in the previous time was the convergence control for quickly converging the steering wheel to the neutral position (S16) in case of the steering wheel return, of the four FETs Q1, Q2, Q3, and Q4 which constitute the H-type bridge of the driving circuit 5, the direction indications of the FETs Q1 and Q2 on the high voltage side are turned OFF (S18). The FETs Q1, Q2, Q3 and Q4 are turned ON according to the PWM signal when the PWM signal is given under the state of the direction indications being off, respectively. In case of the steering wheel convergence control, the direction indications of the FETs Q1 and Q2 are in ON state, and therefore, in case of not performing the steering wheel convergence control, they are first set to OFF state.

Next, the convergence control flag is cleared (S20).

In case of the convergence control flag not being set (S16), there is practiced neither the turning OFF of the direction indications of FETs Q1 and Q2 (S18) nor the clearing of the convergence control flag (S20).

In the case where the vehicle speed signal from the vehicle speed sensor 7 indicates 30 km/h or more (S12), if the steering torque detected by the dead zone detector 23 is within a dead zone of the assist controller 12 (S34), the steering angular velocity is read from the steering angular velocity detector 24 by the duty factor determining unit 25 (S36).

If the steering torque is not within the dead zone (S34), examination is made as to whether the convergence control flag is set or not without reading the steering angular velocity (S16).

Figure 8:
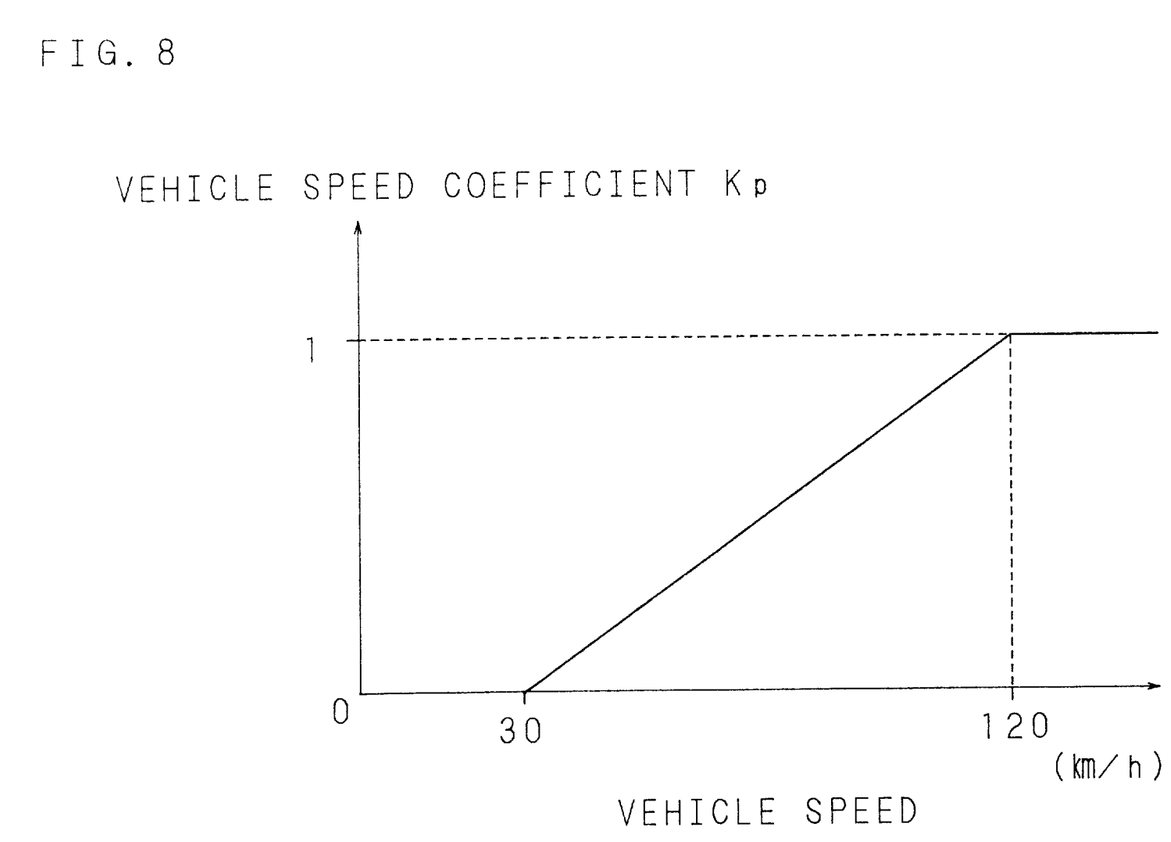
FIG. 8 is a diagram explanatory of a value of a vehicle speed coefficient for calculating a duty factor of PWM control for a wheel convergence control.

When the read (S36) steering angular velocity exceeds 60°/s (S38), the duty factor determining unit 25 calculates the duty factor of the PWM control, i.e. PWM output calculating value=(steering angular velocity −60)×K×Kp, for the steering wheel convergence control (S40), and gives it to the PWM controller 17, where, K is a control gain, Kp is, as shown in FIG. 8, a vehicle speed coefficient which gradually decreases from 0 to 1.0 when the vehicle speed is within 30 km/h to 120 km/h, and which is 1.0 when the vehicle speed is 120 km/h or more.

Figure 9:
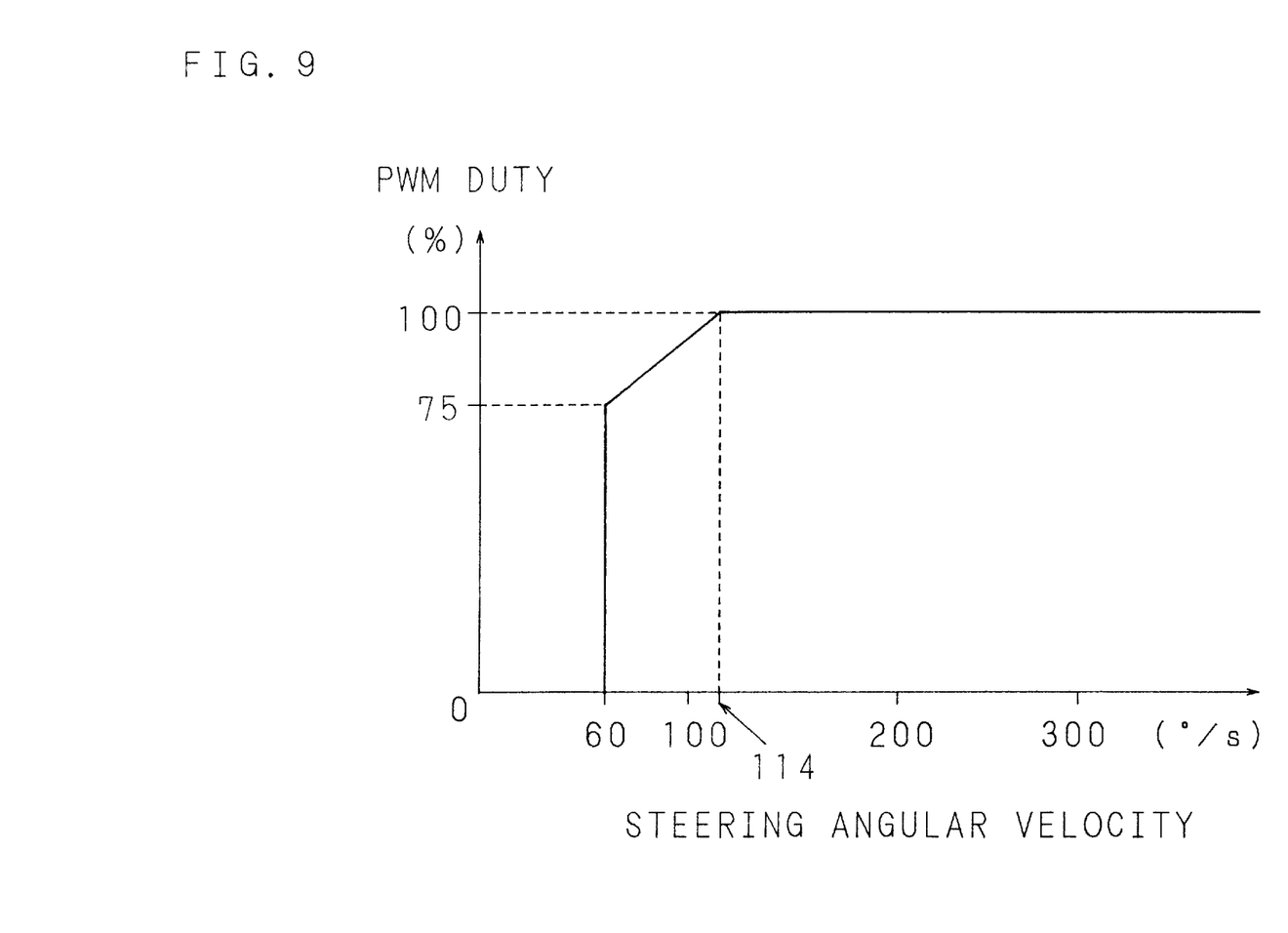
FIG. 9 is a diagram explanatory of the duty factor of the PWM control for the wheel convergence control.

The PWM output calculation value (duty factor), as shown in FIG. 9, for example, gradually increases from 75% to 100% when the steering angular velocity is within 60°/s to 114°/s, and becomes 100% when the steering angular velocity exceeds 114°/s. There, a limiter process is performed so that the calculated value of the PWM output does not exceed 100% (S42).

When the duty factor given from the duty factor determining unit 25 is larger than the predetermined value, the PWM controller 17 turns off the direction indicators of FETs Q3 and Q4 of the driving circuit 5 on the ground side (S44), so that the FETs Q3 and Q4 are not turned ON under the PWM control. Next, the convergence control flag is set (S46) to carry out the angular velocity difference control calculation (S22).

When the vehicle speed exceeds 30 km/h and the read (S36) steering angular velocity is less than 60°/s (S38), the duty factor determining unit 25 does not operate.

When the read (S36) steering angular velocity is less than 60°/s (S38) and the vehicle speed exceeds 80 km/h, for example (S48), whether the convergence control flag is set or not is checked (S16) without operating the steering wheel return current calculating unit 26.

When the vehicle speed is less than 80 km/h (S48) and the steering angular velocity is less than 55°/s, for example (S50), the steering wheel return current calculating unit 26 multiplies the target current value given from the wheel return controller 22 by the vehicle speed coefficient to calculate the target current value for the steering wheel return current (S40).

When the steering angular velocity exceeds 55°/s (S50) and the convergence control flag is not set (S52), the steering wheel return current calculating unit 26 multiplies the target current value given from the wheel return controller 22 by the vehicle speed coefficient to calculate the target current value for the steering wheel return current (Sl4).

When the convergence control flag is set and the control in the previous time was the steering wheel convergence control (S52), of the four FETs Q1, Q2, Q3 and Q4 which constitute the H-type bridge of the driving circuit 5, the direction indications of the FETs Q1 and Q2 on the high voltage side are turned OFF (S18).

Figure 10:
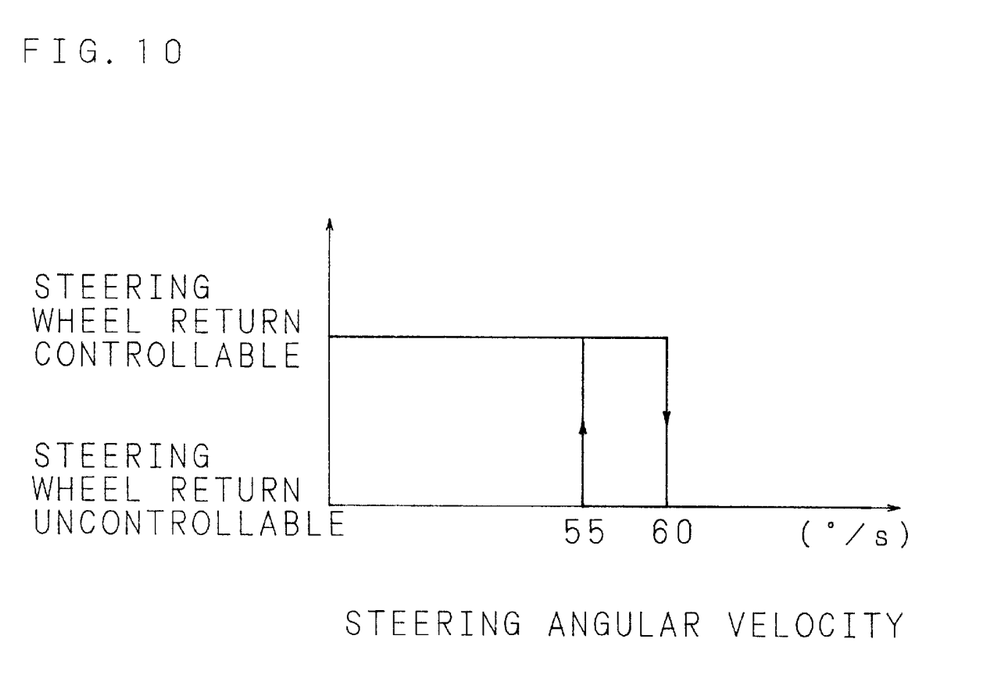
FIG. 10 is a diagram explanatory of a hysteresis of a steering angular velocity when switching the wheel return control and the wheel convergence control.

In the steps S48, S50 and S52, the wheel return control is continuously able to be performed at the vehicle speed within 30 km/h to 80 km/h, as shown in FIG. 10, when the previous control is the wheel return control (calculation of the target current value of the steering wheel return current) and the steering angular velocity is less than 60°/s. The angular velocity difference control is performed at the vehicle speed within 30 km/h to 80 km/h, as shown in FIG. 10, when the previous control is the steering wheel convergence control or assist control (i.e. control with performing neither the steering wheel return control nor the steering wheel convergence control) and the steering angular velocity is between 55°/s to 60°/s.

Accordingly, the steering angular velocity shows the hysteresis when switching the steering wheel return control and the steering wheel convergence control, so that hunting between the steering wheel return control and the braking control is prevented to occur.

Figure 11:
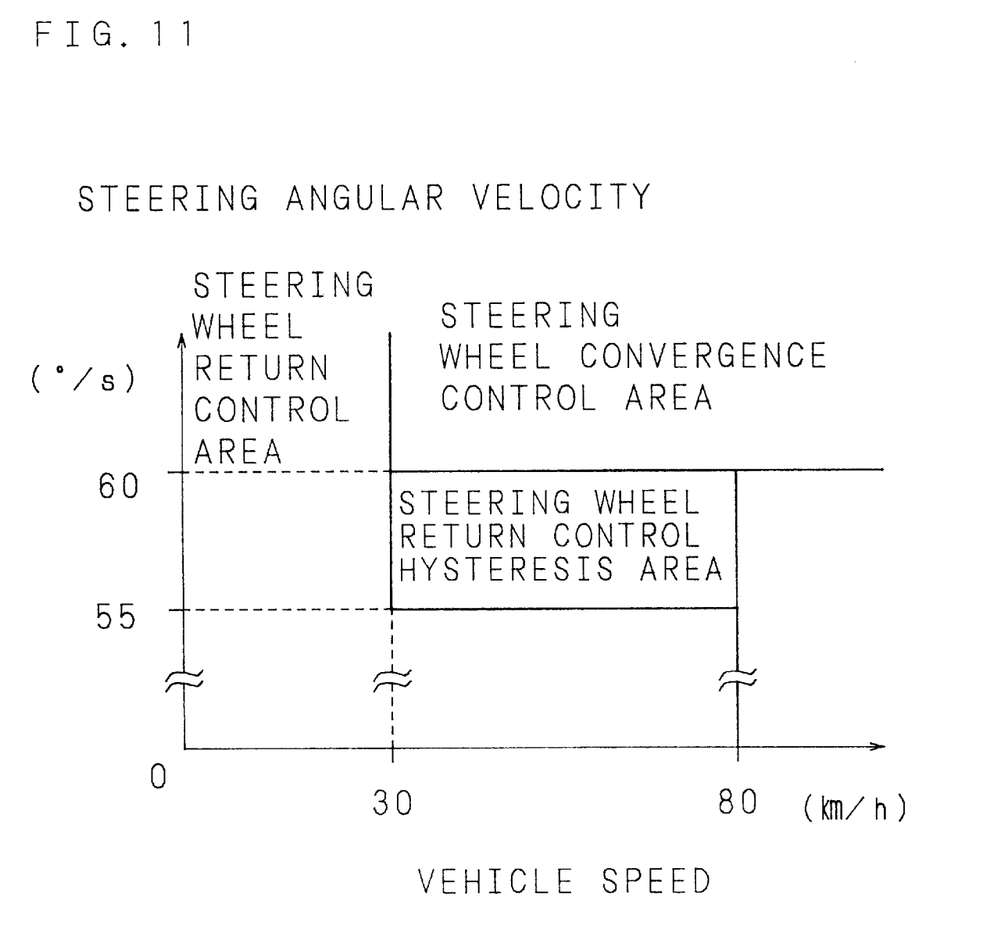
FIG. 11 is a diagram explanatory of relations among vehicle speed, steering angular velocity, the wheel return control and the wheel convergence control.

FIG. 11 is a diagram explanatory of relations among the vehicle speed, the steering angular velocity, the steering wheel return control and the steering wheel convergence control.

The steering wheel return control is operable when the vehicle speed is within 0 km to 30 km/h and when the steering angular velocity is less than 55°/s at the vehicle speed between 30 km to 80 km/h.

The steering wheel convergence control is operable when the vehicle speed exceeds 30 km/h and the steering angular velocity exceeds 60°/s.

The area of the vehicle speed being within 30 km/h to 80 km/h and the steering angular velocity being within 55°/s to 60°/s is the area where the steering angular velocity shows the hysteresis when switching the steering wheel return control and the steering wheel convergence control, so that the steering wheel return control or the assist control is performed according to whether the previous control is the steering wheel return control or not.

The calculation of the angular velocity difference (S22) and the following steps S23, S24, S26, and S28 are performed in any control, in consideration of the continuity of the angular velocity difference control and steering wheel return control with the steering wheel convergence control.

In case of the vehicle speed signal being less than 30 km/h (S12), after clearing the convergence control flag (S20), [if the convergence control flag is not set (S16), after the step S16], for the purpose of the inertia compensation of the motor M, the current value corresponding to the differential value of the steering torque signal and the vehicle speed is calculated (S22) and given to the addition means 14.

On the other hand, the comparative selector 13 gives the target current value to the addition means 14, which has the larger absolute value of either the target current value from the assist controller 12 (S23) or the target current value from the steering wheel return current calculating unit 26 for the steering wheel return (S14).

The addition means 14 adds the target current value selected by the comparative selector 13 to the calculated (S22) current value to calculate the motor current target value (S24).

With respect to the motor current target value, there is obtained a deflection from the feedback value of the driving current of the motor M detected by the motor current detecting circuit 6 in the subtraction means 15, and the deflection is given to the PI controller 16. The PI controller 16 adds the deflection (proportional element) and the integrated value of the deflection (integrated element) to the previous control amount (S26), and gives the resultant amount to the PWM controller 17 as the current control amount.

Next, in the PWM controller 17, if the convergence control flag is not set (S28), this control amount is converted to the PWM wave signal and the signal representing the rotation direction of the motor M and given to the driving circuit 5 (S30, S32).

The motor M rotates in the direction to follow the direction indication by the step that the couple of FETs, i.e. the FETs Q1 and Q4 or the FETs Q2 and Q3 in which the direction indications are turned ON, are turned ON/OFF by the PWM wave signal to perform the assist control or the steering wheel return control.

If the convergence control flag is set (S28), the direction indications of FETs Q1 and Q2 on the high voltage side of the driving circuit 5 are turned ON (S54) to give the PWM wave signal based on the duty factor given from the duty factor determining unit 25 (S40) to the driving circuit 5 (S34).

In the motor M, the FET couple of FETs Q1 and Q2, in which the direction indications are ON, is turned ON/OFF by the PWM wave signal. Hence, in the motor M, a circuit in which the current runs by the inverse electromotive force generated by the own momentum rotation is formed under PWM control (both terminals of the motor M are short-circuited), and the rotating motion is restricted by the braking force exerted by this current (steering wheel convergence control).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An electric power steering apparatus for a vehicle steering system, including a steering wheel comprising:

a motor for assisting steering force;

means for detecting a current value of said motor;

means for detecting steering torque;

means for determining a target value of the motor current on the basis of the detected value of the steering torque;

means for driving said motor so as to make said motor current be said target value;

motor braking means for braking said motor when the detected value of the steering torque is within a predetermined range;

said steering system having a steering angle middle point defined as the position of the steering wheel at which the vehicle advances straight;

steering wheel return controlling means for returning said steering wheel to the steering angle middle point by driving said motor;

vehicle speed detecting means for detecting a vehicle speed;

steering angular velocity detecting means for detecting the rotation speed of the steering wheel;

vehicle speed parameter setting means for setting a first vehicle speed parameter and a second vehicle speed parameter which is higher than the first vehicle speed parameter;

means for comparing the vehicle speed detected by said vehicle speed detecting means with the first and the second vehicle speed parameter set by said vehicle speed parameter settings means, and further for determining an ascertained value based on whether the vehicle speed is above, below or between the first and second vehicle speed parameters steering angular velocity parameter settings means for setting a first steering angular velocity parameter and a second steering angular velocity parameter which is lower than the first angular velocity parameter; and operation switching means, provided with means for comparing the steering angular velocity detected by said steering angular velocity detecing means with the first and the second steering angular velocity parameters, said operation switching means also provided with the ascertained value of the said means for comparing the vehicle speed;

for operating said motor braking means when the vehicle speed detected by the vehicle speed detecting means is higher than the first vehicle speed parameter and the steering angular velocity detected by the steering angular velocity detecting means is higher than the first steering angular velocity parameter, and;

for enabling said steering wheel return controlling means to operate when the detected vehicle speed is lower than the first vehicle speed parameter or when the detected vehicle speed is within the first and second vehicle speed parameter and the detected steering angular velocity is lower than the first steering angular velocity parameter.

2. An electric power steering apparatus as set forth in claim 1, wherein said operation switching means further comprises means for maintaining said steering wheel return controlling means continuously operable under the condition that the detected vehicle speed is between the first and the second vehicle speed parameter when said steering angular velocity is between the second and first steering angular velocity parameter and from the condition that said steering angular velocity is lower than the second steering angular velocity parameter which is lower than the first steering angular velocity parameter, when said steering wheel return controlling means is operable:

and means for maintaining said steering wheel return controlling means continuously inoperable under the condition that said vehicle speed is between the first and second vehicle speed parameter when said steering angular velocity is between the first and second steering angular velocity parameter, and from the condition that said steering angular velocity is higher than the first steering angular velocity parameter when said steering wheel return controlling means is inoperable.

3. An electric power steering apparatus as set forth in claim 1, further comprising additional detecting means for detecting an absolute steering angle of the steering wheel, said steering wheel return controlling means determining a returning current of said motor on the basis of the detected absolute steering angle of the steering wheel and the detected vehicle speed.

4. An electric power steering apparatus as set forth in claim 2, further comprising additional detecting means for detecting an absolute steering angle of the steering wheel, said steering wheel return controlling means determining a returning current of said motor on the basis of the detected absolute steering angle of the steering wheel and the detected vehicle speed.

5. An electric power steering apparatus as set forth in claim 1, further comprising additional detecting means for detecting an absolute steering angle of the steering wheel, said motor braking means braking the motor when the absolute steering angle of the steering wheel is within a dead zone of the steering wheel return controlling means, said dead zone being defined as the range of absolute steering angles in which the motor does not assist steering force.

6. An electric power steering apparatus as set forth in claim 2, further comprising additional detecting means for detecting an absolute steering angle of the steering wheel, said motor braking means braking the motor when the absolute steering angle of the steering wheel is within a dead zone of the steering wheel return controlling means, said dead zone being defined as the range of absolute steering angles in which the motor does not assist steering force.

7. An electric power steering apparatus as set forth in claim 1, wherein said motor braking means increases a value of a duty factor, said duty factor determined from at least one of the vehicle speed detecting means, a dead zone detector, and the steering angular velocity detection:

for braking said motor in proportion to the steering angular velocity when the steering angular velocity detected by said steering angular velocity detecting means is within a predetermined range.

8. An electric power steering apparatus as set forth in claim 2, wherein said motor braking means increases a value of a duty factor, said duty factor determined from at least one of the vehicle speed detecting means, a dead zone detector, and the steering angular velocity detector:

for braking said motor in proportion to the steering angular velocity when the steering angular velocity detected by said steering angular velocity detecting means is within a predetermined range.

9. A electric power steering apparatus as set forth in claim 5, wherein said motor braking means increases a value of a duty factor, said duty factor determined from at least one of the vehicle speed detecting means, a dead zone detector, and the steering angular velocity detector;

for braking said motor in proportion to the steering angular velocity when the steering angular velocity detected by said steering angular velocity detecting means is within a predetermined range.

10. An electric power steering apparatus as set forth in claim 1, wherein said motor braking means increases a value of a duty factor, said duty factor determined from at least one of the vehicle speed detecting means, a dead zone detector, and the steering angular velocity detector;

for braking said motor in proportion to the steering angular velocity when the steering angular velocity detected by said steering angular velocity detecting means in within a predetermined range.

* * * * *